US012476936B2

(12) United States Patent
Saldin et al.

(10) Patent No.: US 12,476,936 B2
(45) Date of Patent: Nov. 18, 2025

(54) NON-STANDARD SECURITY DEVICES THAT PROVIDE INPUTS TO SECURITY SYSTEMS

(71) Applicant: Resolution Products, LLC, St. Paul, MN (US)

(72) Inventors: Paul G. Saldin, Stillwater, MN (US); David J. Mayne, Eagan, MN (US); Brian K. Seemann, Lakeville, MN (US)

(*) Notice: Subject to any disclaimer, the term of this patent is extended or adjusted under 35 U.S.C. 154(b) by 0 days.

(21) Appl. No.: 17/038,500

(22) Filed: Sep. 30, 2020

(65) Prior Publication Data

US 2021/0099430 A1 Apr. 1, 2021

Related U.S. Application Data

(60) Provisional application No. 62/908,059, filed on Sep. 30, 2019.

(51) Int. Cl.
*H04L 29/06* (2006.01)
*H04L 9/40* (2022.01)

(52) U.S. Cl.
CPC ........ *H04L 63/0263* (2013.01); *H04L 63/162* (2013.01); *H04L 63/205* (2013.01)

(58) Field of Classification Search
None
See application file for complete search history.

(56) References Cited

U.S. PATENT DOCUMENTS

| 5,309,144 | A | * | 5/1994 | Lacombe ............ G08B 25/008 340/539.23 |
|---|---|---|---|---|
| 6,624,750 | B1 | | 9/2003 | Marman |
| 7,030,752 | B2 | | 4/2006 | Tyroler |
| 7,262,690 | B2 | | 8/2007 | Heaton |
| 7,449,999 | B2 | | 11/2008 | Hevia |
| 7,633,385 | B2 | | 12/2009 | Cohn |
| 7,855,635 | B2 | | 12/2010 | Cohn |
| 7,956,736 | B2 | | 6/2011 | Cohn |
| 8,073,931 | B2 | | 12/2011 | Dawes |
| 8,335,842 | B2 | | 12/2012 | Raji |

(Continued)

FOREIGN PATENT DOCUMENTS

| CN | 101013976 | 8/2007 |
|---|---|---|
| CN | 101030902 | 9/2007 |

(Continued)

*Primary Examiner* — Jeffery L Williams
(74) *Attorney, Agent, or Firm* — Barnes & Thornburg LLP

(57) ABSTRACT

In one implementation, a computer-implemented method includes defining, in a security system, a non-standard security device rule that describes a pattern of signals, from one or more non-standard security devices, that may be received by a security system, wherein the non-standard security device rule defines an action to perform when the non-standard security device rule is satisfied; monitoring, by the security system, wireless signals from one or more non-standard security devices; determining that the monitored wireless signals from the one or more non-standard security devices match the non-standard security device rule; and performing the action in response to determining that the monitored wireless signals from the one or more non-standard security devices match the non-standard security device rule.

11 Claims, 12 Drawing Sheets

(56) References Cited

U.S. PATENT DOCUMENTS

| | | | |
|---|---|---|---|
| 8,401,575 B2 | 3/2013 | Fischer | |
| 8,456,278 B1 | 6/2013 | Bergman | |
| 8,473,619 B2 | 6/2013 | Baum | |
| 8,478,844 B2 | 7/2013 | Baum | |
| 8,478,871 B2 | 7/2013 | Gutt | |
| 8,612,591 B2 | 12/2013 | Dawes | |
| 8,638,211 B2 | 1/2014 | Cohn | |
| 8,649,386 B2 | 2/2014 | Ansari | |
| 8,970,368 B2 | 3/2015 | Bergman | |
| 9,141,276 B2 | 9/2015 | Dawes | |
| 9,412,248 B1 | 8/2016 | Cohn et al. | |
| 10,178,533 B2 | 1/2019 | Saldin et al. | |
| 10,311,359 B2 | 6/2019 | Seemann et al. | |
| 10,516,765 B2 * | 12/2019 | Seemann | H04L 69/08 |
| 10,621,139 B2 | 4/2020 | Hofstaedter | |
| 10,861,305 B2 * | 12/2020 | Gordon-Carroll | H04W 4/21 |
| 10,878,322 B2 | 12/2020 | Seeman et al. | |
| 11,200,435 B1 * | 12/2021 | Scanlon | G05D 1/0094 |
| 11,346,143 B1 * | 5/2022 | Trundle | G07C 9/00896 |
| 2002/0077077 A1 | 6/2002 | Rezvani et al. | |
| 2004/0204019 A1 | 10/2004 | Addy | |
| 2005/0232186 A1 | 10/2005 | Karaoguz et al. | |
| 2006/0072542 A1 | 4/2006 | Sinnreich et al. | |
| 2008/0181130 A1 | 7/2008 | Balu | |
| 2009/0070681 A1 | 3/2009 | Dawes et al. | |
| 2009/0077622 A1 | 3/2009 | Baum et al. | |
| 2009/0138547 A1 | 5/2009 | Boudreau | |
| 2009/0233602 A1 | 9/2009 | Hughes | |
| 2009/0237246 A1 * | 9/2009 | White | G08B 13/196 |
| | | | 340/541 |
| 2010/0277300 A1 | 11/2010 | Cohn | |
| 2010/0304673 A1 | 12/2010 | Yoshizawa | |
| 2010/0323665 A1 | 12/2010 | Ibe et al. | |
| 2011/0191465 A1 | 8/2011 | Hofstaedter | |
| 2012/0036242 A1 | 2/2012 | Wittenburg et al. | |
| 2012/0089299 A1 | 4/2012 | Breed et al. | |
| 2013/0051395 A1 | 2/2013 | Hansen | |
| 2013/0124736 A1 | 5/2013 | Park | |
| 2013/0154558 A1 | 6/2013 | Lee | |
| 2013/0265158 A1 | 10/2013 | Bergman et al. | |
| 2014/0062297 A1 | 3/2014 | Bora | |
| 2014/0089143 A1 | 3/2014 | Dione | |
| 2014/0115142 A1 | 4/2014 | Peng | |
| 2014/0133378 A1 | 5/2014 | Wentink | |
| 2014/0156819 A1 | 6/2014 | Cavgalar | |
| 2014/0173692 A1 | 6/2014 | Srinivasan | |
| 2014/0207707 A1 | 7/2014 | Na | |
| 2015/0005024 A1 | 1/2015 | Fudickar | |
| 2015/0049189 A1 | 2/2015 | Yau et al. | |
| 2015/0067816 A1 | 3/2015 | Rados | |
| 2015/0098375 A1 | 4/2015 | Ree | |
| 2015/0170506 A1 | 6/2015 | Bergman | |
| 2015/0178548 A1 | 6/2015 | Abdallah | |
| 2016/0100023 A1 | 4/2016 | Kim | |
| 2016/0295397 A1 | 10/2016 | Nielson | |
| 2016/0323972 A1 | 11/2016 | Bora | |
| 2016/0364979 A1 * | 12/2016 | Warren | G08C 17/02 |
| 2017/0079257 A1 | 3/2017 | Haensgen | |
| 2017/0127124 A9 | 5/2017 | Wilson | |
| 2017/0127155 A1 | 5/2017 | Zheng | |
| 2017/0337805 A1 * | 11/2017 | Eyring | H04L 67/306 |
| 2018/0005514 A1 * | 1/2018 | Eyring | G08B 25/008 |
| 2018/0097830 A1 | 4/2018 | Shibata | |
| 2018/0198841 A1 * | 7/2018 | Chmielewski | H04L 12/2818 |
| 2019/0097865 A1 * | 3/2019 | Xu | A61B 5/4809 |
| 2019/0141506 A1 | 5/2019 | Saldin | |
| 2020/0064456 A1 * | 2/2020 | Xu | G01S 7/417 |
| 2020/0344586 A1 | 10/2020 | Saldin | |
| 2021/0166134 A1 | 6/2021 | Seeman | |
| 2021/0185095 A1 * | 6/2021 | Harel | G06F 9/45558 |
| 2021/0209881 A1 * | 7/2021 | Lemberger | H04N 7/183 |
| 2021/0234723 A1 * | 7/2021 | Madden | H04L 12/2834 |
| 2022/0101718 A1 * | 3/2022 | Poder | G08B 25/10 |
| 2022/0207972 A1 * | 6/2022 | Madden | G07C 9/00571 |
| 2022/0262233 A1 * | 8/2022 | Rodolico | G08B 21/10 |

FOREIGN PATENT DOCUMENTS

| | | |
|---|---|---|
| CN | 101052345 | 10/2007 |
| CN | 101321180 | 12/2008 |
| CN | 102308073 | 1/2012 |
| WO | WO 2017/001928 | 1/2017 |
| WO | WO 2020/206453 | 10/2020 |

* cited by examiner

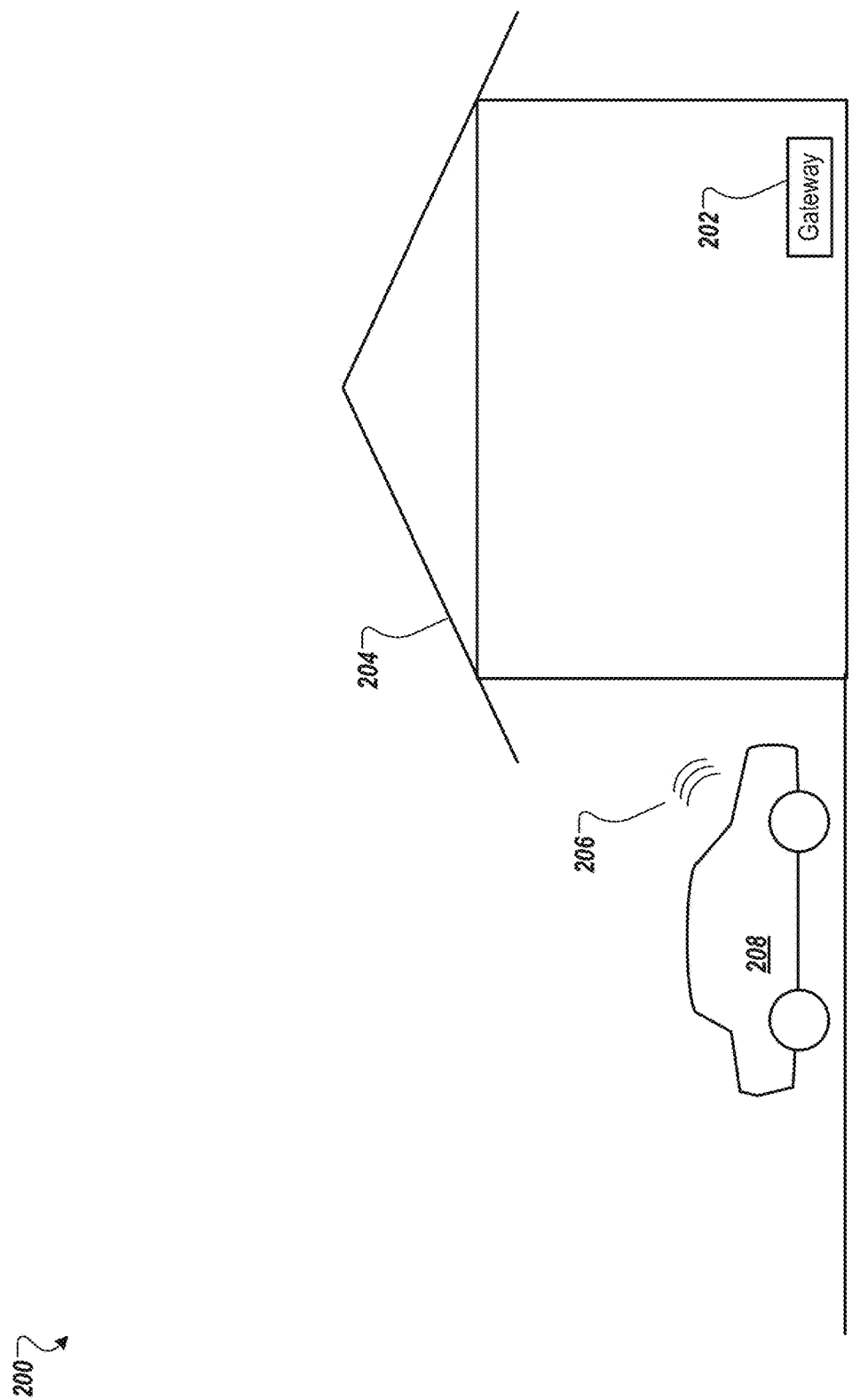

NON-STANDARD SECURITY DEVICES THAT PROVIDE INPUTS TO SECURITY SYSTEMS

CROSS-REFERENCE TO RELATED APPLICATIONS

This application claims benefit of U.S. Provisional Patent Application No. 62/908,059, filed Sep. 30, 2019 and is incorporated herein by reference.

TECHNICAL FIELD

This specification generally relates to security systems.

BACKGROUND

In the developing connected and secure home, the services layer can garner value from the multitude of information coming from the multitude of sensors pre-existing or added in homes, buildings, and other locations. For example, at present many homes include multiple different sensors that transmit information about one or more components/systems within the homes, such as information indicating whether doors/windows are open or closed, motion sensor information, alarm status information, environmental information, and other information that sensors are capable of detecting. A large portion of installed sensors are wireless—meaning that they transmit at least some information wirelessly using one or more wireless protocols. The information from these sensors can have a variety of uses, such as being used to chart, classify and model consumer habits, initiate actions outside the home, automate devices and functions inside the home, and provide core security, life safety and home infrastructure monitoring and response.

Enrolling sensors with a third-party wireless system (e.g., a system not preconfigured to use or connect with particular sensors) can be a non-trivial operation. For instance, the wireless air can be considered one large, common channel over which all sensors are talking. Generally, an installer can enroll a sensor with a wireless system by causing a unique, uncommon transmission to be sent by the sensor, in order to ensure the correct sensor among many is being enrolled. Or, in another example, a unique identifier can be known for a sensor and entered into the wireless system. In a further example, installing old sensors with a wireless system (e.g., in takeover installations of old sensors) can include the installer identifying the make, model and function of each old sensor, which can be time-consuming and can require a fair amount of installer expertise. Regardless of how it is accomplished, the enrollment paradigm may be considered "closed," in a sense that an installer or user knows the sensors that are to be enrolled as part of the system, and some user action with the sensor is performed so that the desired sensor is installed.

SUMMARY

This document generally describes technology for enrolling non-standard security devices with security systems and using data from those non-standard security devices as inputs for the security systems. For example, standard security system devices can include sensors, cameras, and other devices that are designed to transmit information about a premises (e.g., building, home) to a security system controller (e.g., security system gateway, control panel), which can use that information to assess the current state of the premises and, if warranted, to take one or more security actions (e.g., activate siren, send alarm notification, actuate mechanical locks). Non-standard security devices can be devices that are capable of transmitting information wirelessly, but they can have a primary intended function that is different from and unrelated to security systems and the information they transmit may not be readily usable as input by conventional security systems. For example, non-standard security devices can include consumer products, like smartphones, tablets, gaming systems, smart televisions, appliances (e.g., internet-connected refrigerators), wearable devices (e.g., smart watches, fitness trackers), vehicles (e.g., internet-connected automobiles), and other consumer products with wireless transmission capabilities. Non-standard security devices are not limited to consumer products, though, and can include other devices and systems that transmit information wirelessly without a primary intended purpose related to security systems.

The disclosed technology can include security system controllers that are configured to enroll non-standard security devices, either actively or passively, as part of the security system and to use information that is wirelessly transmitted by the non-standard security devices in order to perform security-related actions. For example, a security controller can actively enroll non-standard security devices by wirelessly pairing or otherwise wirelessly communicating with the devices (e.g., BLUETOOTH pairing, Wi-Fi communication, communication over a local area network (LAN), communication over a wide area network (WAN)), being provided with access to a data transmitted by the devices (e.g., enrolling devices with security controller so that the data is readable by the controller, subscribing security controller to data stream published by the devices), and/or other enrollment techniques. A security controller can additionally (and/or alternatively) passively enroll non-standard security devices by, for example, obtaining identifiers for the non-standard security devices (e.g., MAC address, device name, device identifier) and using those identifiers to detect and monitor the physical presence of the non-standard security devices around a premises based on detected wireless signals transmitted by the non-standard security devices. Enrolled non-standard security devices can be associated with one or more attributes, such as the device type, associated users, associated permissions, and/or other features associated with devices and/or users.

Non-standard security devices enrolled with a security system can be used to make various security-related determinations, such as determinations regarding the state of a premises, users who are present at the premises, and/or other determinations. For example, wireless signals transmitted by enrolled non-standard security devices (e.g., smartphone, vehicle, wearable device) can be used to determine whether authorized users associated with the devices are arriving at or leaving a premises, which can prompt the security system to automatically perform security actions, such as locking/unlocking doors, turning on/off lights, arming/disarming one or more security perimeters at the premises provided by the security system, and/or other automated actions.

Systems, methods and techniques are described herein. In one implementation, a computer-implemented method includes defining, in a security system, a non-standard security device rule that describes a pattern of signals, from one or more non-standard security devices, that may be received by a security system, wherein the non-standard security device rule defines an action to perform when the non-standard security device rule is satisfied; monitoring, by the security system, wireless signals from one or more non-standard security devices; determining that the monitored wireless signals from the one or more non-standard security devices match the non-standard security device rule; and performing the action in response to determining that the monitored wireless signals from the one or more non-standard security devices match the non-standard security device rule.

Such a method can optionally include one or more of the following features. The pattern can specify an abnormal signal pattern. The abnormal signal pattern can be defined in reference to a normal signal pattern determined from historical signals from the one or more non-standard security devices. The action can include configuring the security system. Configuring the security system can include automatically arming the security system. The action can include generating an alert. The alert can be provided to at least one non-standard security device. The non-standard security device can include a vehicle. The non-standard security device rule can be a vehicle system rule describes a pattern of the vehicle being present or not present at a location monitored by the security system. The vehicle system rule can define an action to perform when the vehicle system rule is satisfied by the presence or non-presence of a respective vehicle. The monitoring can include monitoring wireless signals from the vehicle that is at the location. The determining can include determining that the monitored wireless signals from the first vehicle match the vehicle system rule. The performing can include performing the action in response to determining that the monitored wireless signals from the first vehicle match the vehicle system rule. The first vehicle can be registered with the security system. The monitored wireless signals can indicate that the first vehicle is present at the location and the action comprises automatically disarming the security system. The monitored wireless signals can indicate that the first vehicle is no longer present at the location and the action comprises automatically arming the security system. The first vehicle can not registered with the security system and the monitored wireless signals indicate that the first vehicle is present at the location. The action can include automatically arming the security system. The action can include generating an alert.

Certain implementations may provide one or more advantages. For example, enrolling non-standard security devices can expand and enhance the security related signals that are received and processed by a security system, which can provide the security system with a more detailed and accurate representation of a premises and the people who are present at the premises. For instance, conventional security systems relying on standard security devices to provide information related to a premises may be closed off to receiving and enhancing that information, or to replacing some or all of that information with other information provided by non-standard security devices. The disclosed technology can permit for, in some instances, standard security devices to be replaced and/or supplemented with non-standard security devices, which can provide for greater flexibility and enhanced capabilities as new non-standard security devices are introduced to a premises.

In another example, actions can be automatically performed by a security system in response to a detected presence or non-presence of a non-standard security devices, such as vehicles, at or near a premises monitored by the security system. As another example, actions can be automatically performed by the security system in response to signals received from non-standard security devices that have been enrolled with the security system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE ATTACHMENTS

FIGS. 2A and 2B are conceptual diagrams of example systems for performing an action in response to satisfaction of a vehicle system rule.

Like reference numbers and designations in the various drawings indicate like elements.

DETAILED DESCRIPTION

Figure 1:
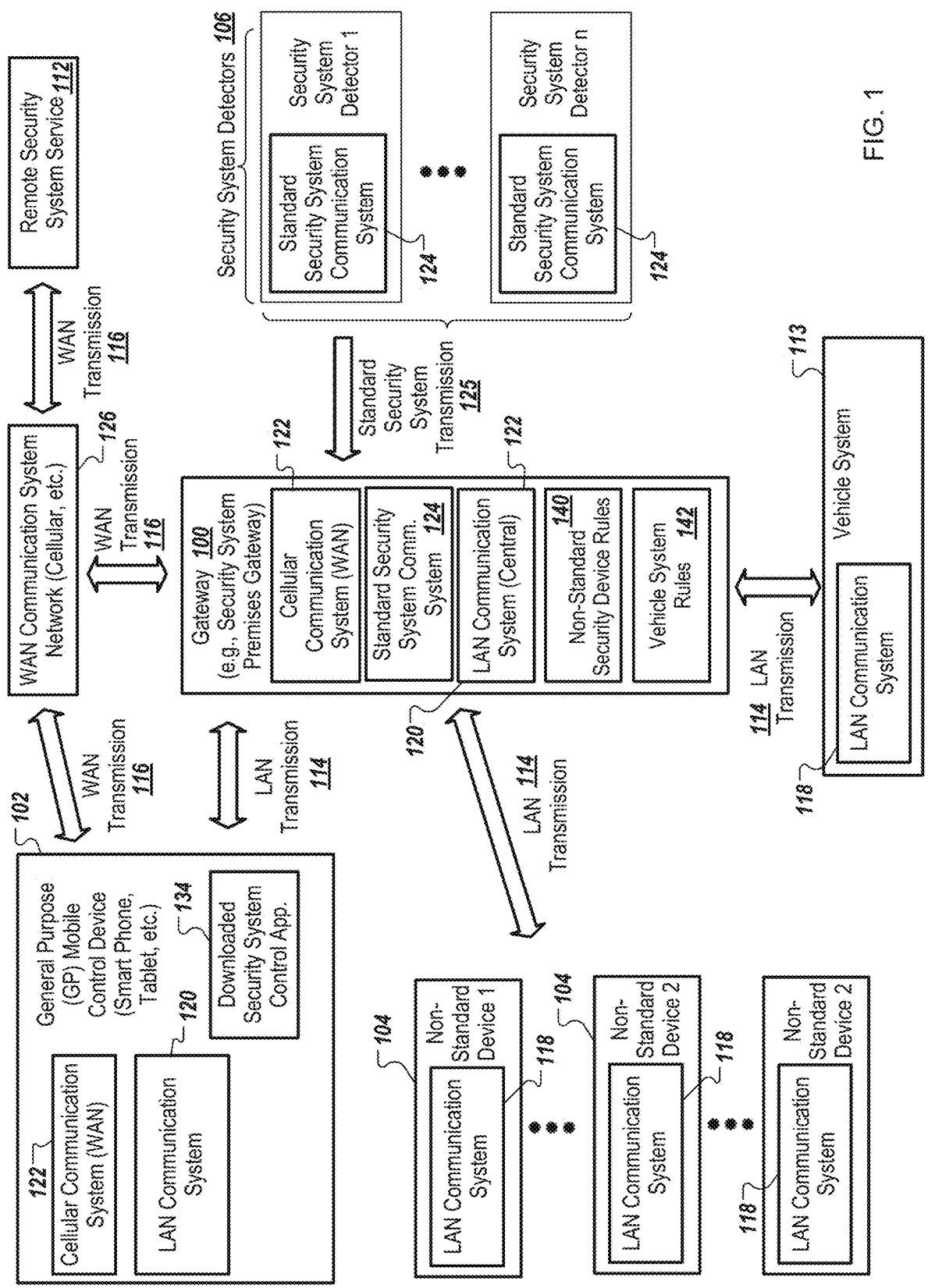
FIG. 1 is a block diagram of an example security system environment.

FIG. 1 is a block diagram showing interactions within an example security system. For example, the security system can include a security system premises gateway (e.g., a gateway 100) and related components. The example gateway 100 can control the security system and can provide an interface for a mobile computing device 102 to access/control the security system. Mobile devices 102 can include, for example, general purpose mobile control devices, including smart phones, tablet computing devices, laptop computers, wearable computing devices, and/or other computing devices that may be mobile. Other types of computing devices can be used as the mobile device 102.

The gateway 100 can communicate with other components, including non-standard security devices 104, security system detectors 106, a remote security system service 112, and a vehicle system 113 (illustrative example of a non-standard security device).

Communications among the gateway 100 and related components can include local area network (LAN) communications 114 and wide area network (WAN) communications 116. LAN communications 114 can be used, for example, among components that are situated in the premises of the gateway 100, including the mobile device 102, the non-standard security devices 104, and/or the vehicle system 113 (example of a non-standard security device) when present within a threshold distance of the gateway 100 (e.g., in or near the home or other building(s) in which the gateway 100 is located). Components that communicate over the LAN can include LAN communication systems 118 (peripheral role) and 120 (central role), and a cellular communication system 122 (e.g., WAN). Security system-related components can use a standard security system communication system 124 (e.g., using standard security system transmissions 125). WAN communication between the gateway 100 and the mobile device can be handled using a WAN communication system network 126 (e.g., that services cellular phone networks). In some implementations, communication between the gateway 100 and the mobile device 102 can be handled with a downloaded security system control application 134.

Non-standard security devices 104 can include components in the premises that may not be security system-related, such as temperature sensors and controls (including heating and air conditioning), garage doors, appliances, lights, smart watches, and other systems. In some implementations, the non-standard security devices 104 can be part of an IoT device ecosystem on the premises. In some implementations, the non-standard security devices 104 can be enrolled with the security system before communicating and sending information to the gateway 100.

Non-standard security device rules 140 can be defined, and stored in the gateway 100. The non-standard security devices rules 140 can each describe a pattern of signals, from one or more non-standard security devices 104, that may be received by the gateway 100. Each non-standard security device rule 140 can define one or more actions to perform when the non-standard security device rule 140 is satisfied by detecting a pattern of received signals that matches the signal pattern in the non-standard security devices rule 140.

The gateway 100 can monitor wireless (or wired) signals received from one or more non-standard security devices 104, determine that the monitored wireless signals from the one or more non-standard security devices 104 match a particular non-standard security device rule 140, and perform an action specified in the non-standard security device rule 140 in response to determining that the monitored wireless signals from the one or more non-standard security devices 104 match the non-standard security device rule 140. Examples of non-standard security devices 104 and non-standard security device rules 140 are discussed in more detail below.

Vehicle system rules 142 (illustrative example of non-standard security device rules 140) that each describe security rules and corresponding security actions to be taken related to information pertaining to particular vehicle systems, such as rules relating to a pattern of a vehicle being present or not present at a location monitored by the gateway 100 can be defined and stored in the gateway 100. Each vehicle system rule 142 defines an action to perform when the vehicle system rule 142 is satisfied when a detected presence or non-presence of a respective vehicle matches the pattern. The gateway 100 can monitor wireless signals from vehicle(s) that are at the location, determine that the monitored wireless signals from a given vehicle match a particular vehicle system rule, and automatically performing an action specified in the vehicle system rule in response to determining that the monitored wireless signals from the first vehicle match the vehicle system rule. Examples of vehicle system rules 142 are discussed in more detail below. As a specific example, the gateway 100 can automatically disarm the security system in response to detecting presence of a registered vehicle.

Figure 2B:
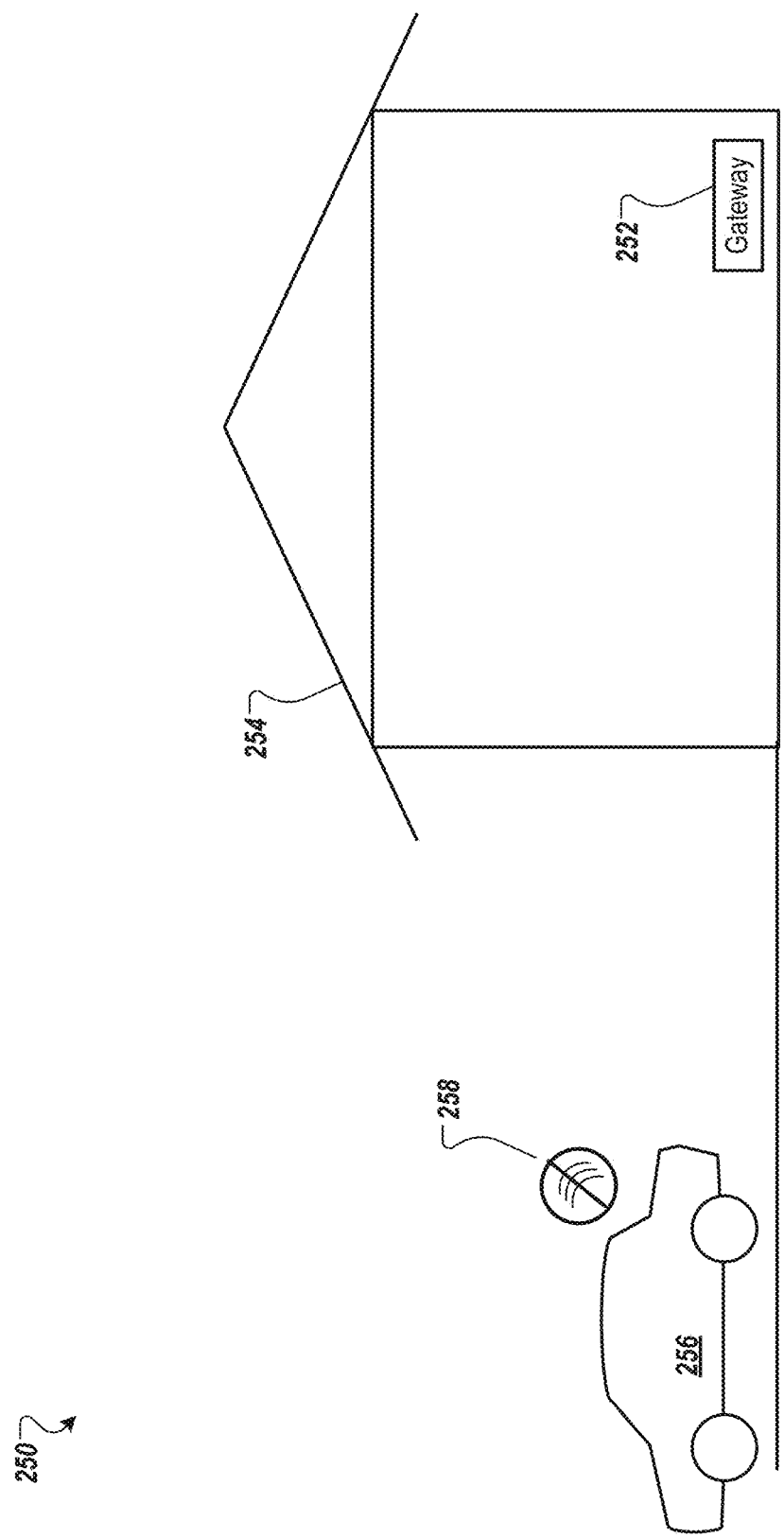

FIGS. 2A-B are conceptual diagrams of example systems 200 and 250 for performing an action in response to receiving information from a non-standard security device and determining that the information has satisfied one or more non-standard security device rules. In these examples, the non-standard security device is a vehicle and the non-standard security device rule is a vehicle system rule. For instance, referring to FIG. 2A, a security system gateway 202 of a security system monitors a home 204. The security system gateway 202 detects a wireless signal 206 from a vehicle 208 that is approaching and parking at the home 204. The vehicle 208 may be parked in the driveway or in a garage, for example. The security system gateway 202 evaluates the wireless signal 206 to determine an identifier for the vehicle 208. The security system gateway 202 determines that the vehicle 208 is a registered vehicle (e.g., known to the security system).

In response to determining that the vehicle 208 is a registered vehicle that has just approached the home 204, the security system gateway 202 can automatically perform one or more actions. For example, the security system gateway 202 can automatically disarm the security system (e.g., due to assuming that a known user is arriving in a known vehicle). As another example, the security system gateway 202 can initiate one or more home automation processes (e.g., turning on lights, adjusting a thermostat). The one or more actions can be associated with a vehicle system rule that has been defined in the security system that describes a pattern of a vehicle being present at the home 204, with the rule specifying that certain action(s) are to be performed upon detecting the presence of the vehicle at the home 204. The security system gateway 202 can send a notice regarding the automatic disarming of the security system (e.g., to a mobile device of an owner/user of the vehicle 208, to a display in the vehicle 208, etc.).

Referring to FIG. 2B, a security system gateway 252 of a security system monitors a home 254. The security system gateway 252 may have previously detected a wireless signal from a vehicle 256 that had been located at (e.g., parked at) the home 254. The security system gateway 252 can detect that the vehicle 256 is leaving (or has left) the home 254. For example, after a period of time of detecting a constant signal of at least a threshold signal strength from the vehicle 256 (e.g., when the vehicle 256 is parked at the home 254), the security system gateway 252 can detect a weakening of a signal emitted from the vehicle 256 (e.g., as the vehicle 256 is driving away from the home 254) followed by an absence of a detected signal (e.g., as indicated by a no-signal symbol 258) as the vehicle 256 travels out of signal range with the security system gateway 252.

In response to detecting that the vehicle 256 is no longer located at the home 254, the security system gateway 252 can automatically perform one or more actions. For instance, the security system gateway 252 can automatically arm the security system. The one or more actions can be associated with a vehicle system rule that has been defined in the security system that describes a pattern of a vehicle leaving the home 204, with the rule specifying that certain action(s) are to be performed upon detecting a registered vehicle leaving the home 254. The security system gateway 252 can send a notice regarding the automatic arming of the security system (e.g., to a mobile device of an owner/user of the vehicle 256, to a display in the vehicle 256, etc.).

Figure 3:
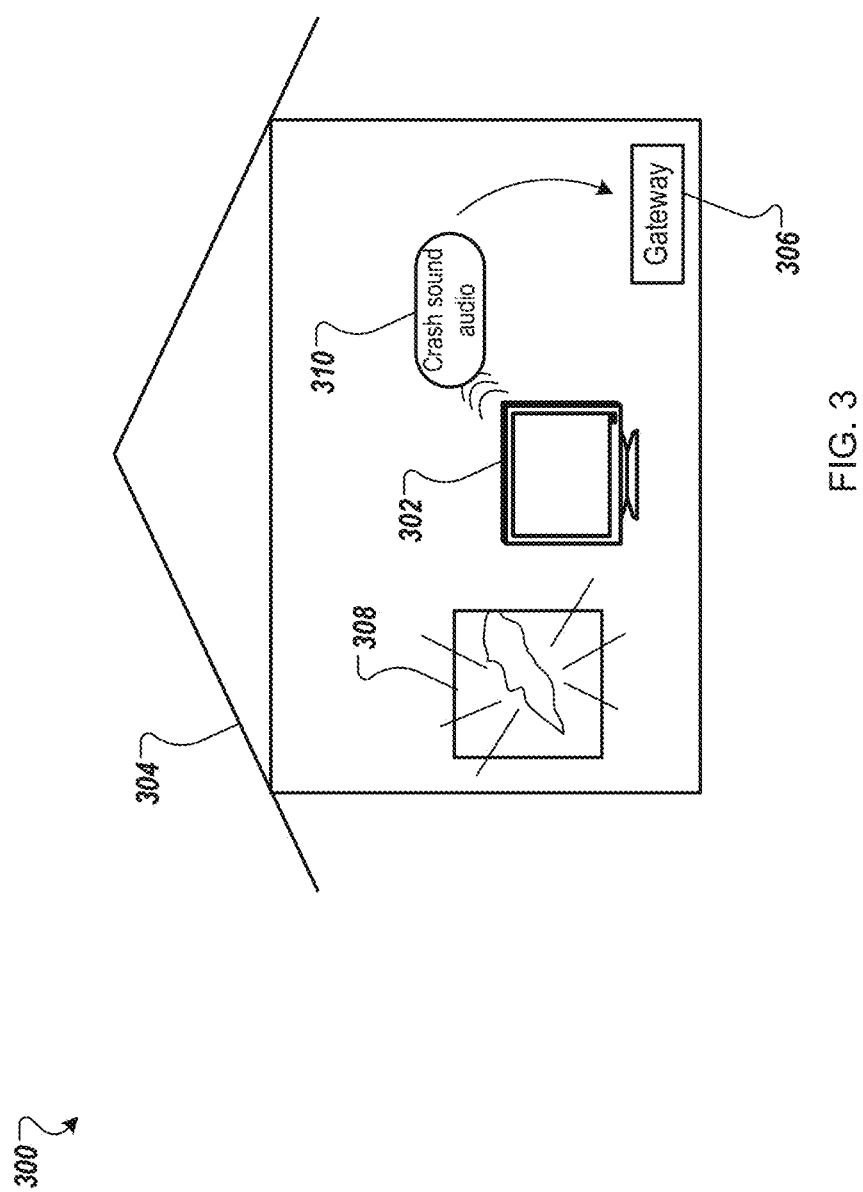
FIG. 3 is a conceptual diagram of an example system for performing an action in response to information received from a non-standard security device.

FIG. 3 is a conceptual diagram of an example system 300 for performing an action in response to information received from a non-standard security device. A smart television 302 in a home 304 is configured to send information to a security system gateway 306. For instance, the smart television 302 can have a microphone, use the microphone to record audio, and send audio information for audio captured by the microphone to the security system gateway 306. In some implementations, the smart television 302 analyzes the captured audio and sends information about a nature of the captured audio to the security system gateway 306. For instance, the smart television 302 can determine that captured audio corresponds to a breaking of a window 308. As another example, the smart television 302 can be configured to send captured audio 310 to the security system gateway 306 and the security system gateway 306 can analyze the received audio data. For instance, the security system gateway 306 can determine that received audio corresponds to a breaking of the window 308.

The security system gateway 306 can be configured to perform one or more actions in response to receiving certain types of audio information (e.g., information indicating a window breakage) or to determining that received audio matches a particular pattern (e.g., received audio matching a window breaking audio pattern). The security system gateway 306 (or the smart television 302) can compare received or captured audio, respectively, to pre-recorded template recordings, can use machine learning to determine that received or captured audio matches certain predetermined noise types, or can use other approaches. A predefined action can be to generate one or more alerts if a noise of a particular type is detected, for example.

Although a smart television is used as an example, other non-standard security devices can capture and send audio (or information about captured audio) to the security system gateway 306. For example, gaming consoles, phone systems, music equipment, or other devices with a microphone can be used.

Figure 4:
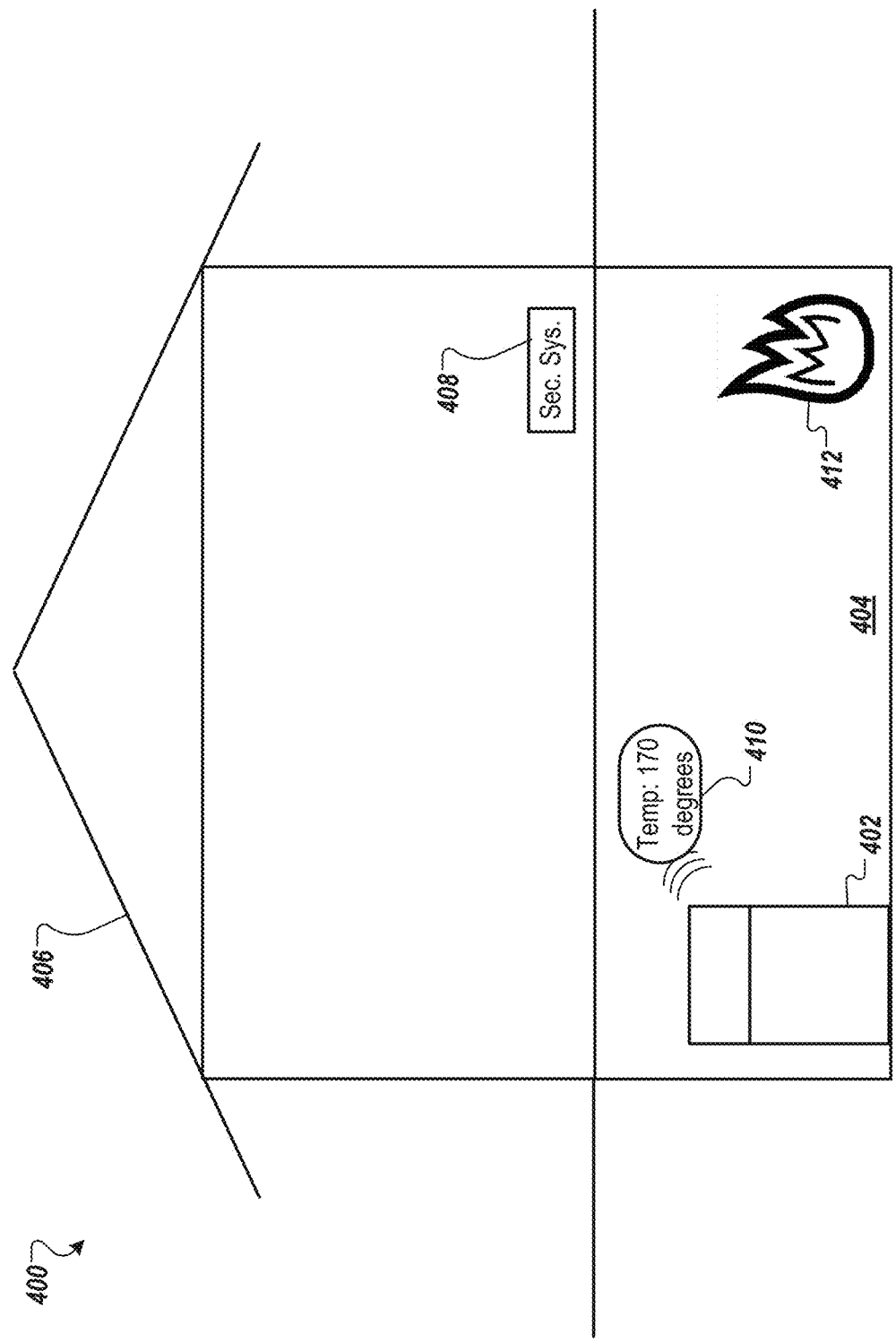
FIG. 4 is a conceptual diagram of an example system for performing an action in response to information received from a non-standard security device.

FIG. 4 is a conceptual diagram of an example system 400 for performing an action in response to information received from a non-standard security device. A smart refrigerator 402 in a basement 404 of a home 406 is configured to send information to a security system gateway 408. The smart refrigerator 402 can be configured to send information periodically or in response to a detected event. For instance, the smart refrigerator 402 can send a temperature reading from a thermometer that measures ambient air outside of the smart refrigerator 402 in the basement 404.

The smart refrigerator 402 can send a temperature value to the security system gateway 408 periodically (e.g., every minute), or in response to determining that a read temperature is more than a threshold temperature. For instance, in response to determining that a read temperature of 170 degrees is more than a threshold temperature of 150 degrees, the smart refrigerator 402 can send temperature information 410 to the security system gateway 408. The read temperature information may be 170 degrees, for example, due to a fire 412 that has started in another area of the basement 404.

The security system gateway 408 can perform one or more actions in response to receiving the temperature information 410. For example, the security system gateway 408 can automatically generate one or more alerts or alarms, automatically send a message to a mobile device of an owner of the home 406, automatically send a message to emergency responder(s), etc. The security system gateway 408 may determine to perform an action based on the received temperature information 410 and on other received or determined information. For example, the security system itself may have temperature sensors which have provided temperature information to the security system gateway 408. As another example, other non-standard security devices, such as personal computers, mobile computing devices, or other smart appliances may have provided temperature information to the security system gateway 408.

Figure 5:
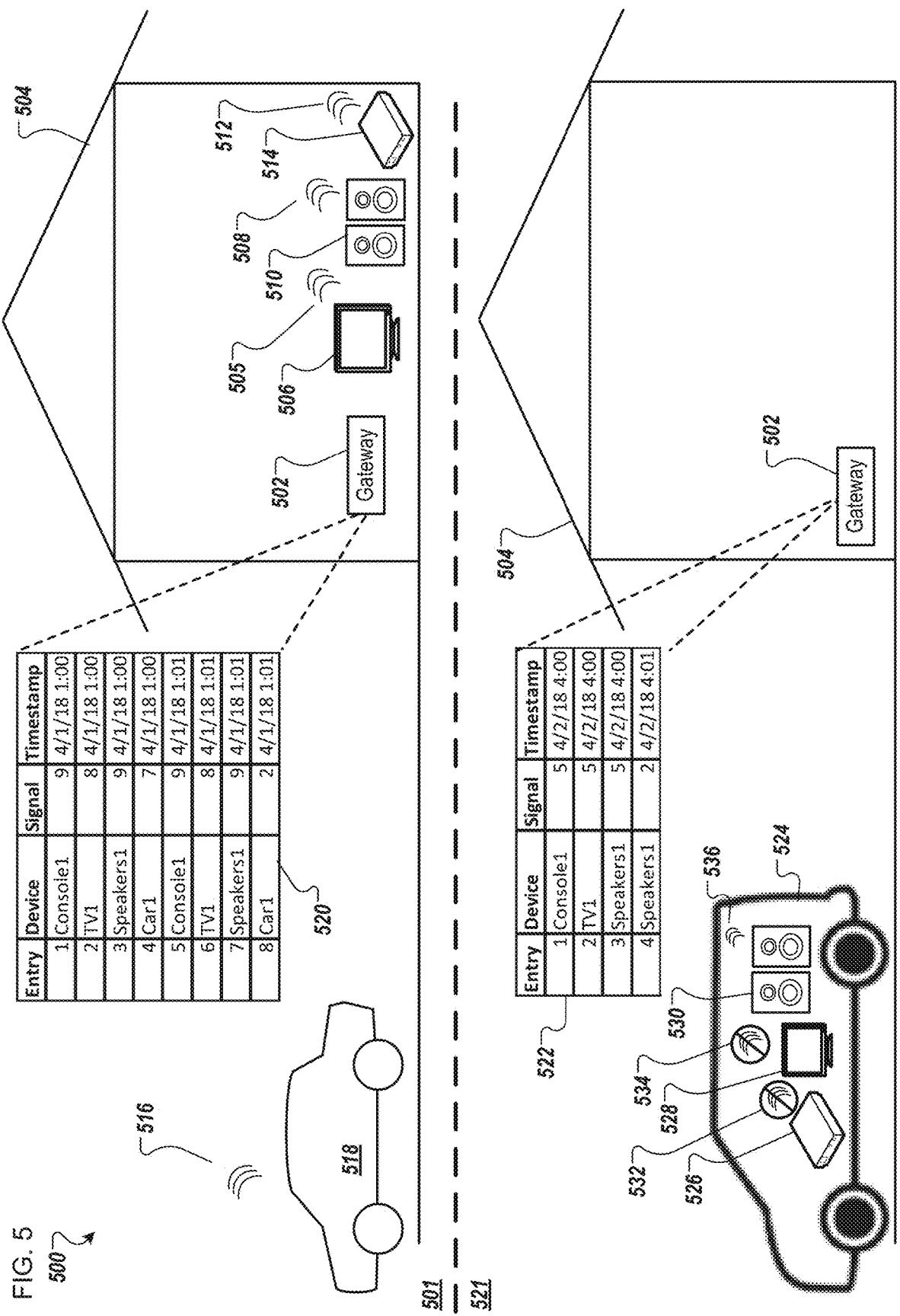
FIG. 5 is a conceptual diagram of an example system for detecting abnormal patterns in signals received from non-standard security devices.

FIG. 5 is a conceptual diagram of an example system 500 for detecting abnormal patterns in signals received from non-standard security devices. As shown in an upper portion 501 of FIG. 5, a security system gateway 502 in a home 504 can receive signals from various items in the home 504. The security system gateway 502 can receive signals from non-standard security devices, including a signal 505 from a smart television 506, a signal 508 from smart speakers 510, and a signal 512 from a gaming console 514. As another example, the security system gateway 502 can receive a signal 516 from a car 518 (e.g., from an in-vehicle system within the car 518).

The security system gateway 502 can record information about received signals. For instance, as shown in a table 520, the security system gateway 502 can record a device identifier, a signal strength, and a timestamp, for each signal received from a device or system within or in proximity to the home 504. For instance, entries five, six, and seven in the table 520 may correspond to the signal 512, the signal 505, and the signal 508, respectively. Entries one, two, and three may correspond to earlier signals received from the gaming console 514, the smart television 506, and the smart speakers 508, respectively.

Entry four in the table 520 may correspond to a signal from the car 518 when the car 518 was parked in front of the home 504. Entry eight in the table 520 may correspond to the signal 516 which may be a lesser signal than recorded in the entry four due to the car 518 leaving the driveway, for example. The security system gateway 502 can determine a presence or non-presence and/or an approach or departure of the car 518, based on changes in received signal strengths or an absence of a detected signal from the car 518. For instance, the entry four in the table 520, with a signal strength of seven (out of ten, for example), may indicate that the car is parked at the home 504 (e.g., in a driveway or garage). The entry eight in the table 520, with a signal strength of two may indicate that the car 518 is leaving a driveway (e.g., as illustrated).

The security system gateway 502 can analyze stored entries in the table 520 and can determine signal patterns from received devices or systems. The security system gateway 502 can determine regular (e.g., "normal") patterns of signals, over time. The security system gateway 502 can later detect abnormal, or irregular signal patterns that deviate from regular patterns. The security system gateway 502 can detect regular signal patterns from data in the table 520 in that the smart television 506, the smart speakers 510, and the gaming console 514 generally have consistent signal strengths, for example, due to being in stable locations within the home 504.

A lower portion 521 of FIG. 5 illustrates the home 504 at a later point in time, with an updated table 522 showing entries for signals received at a point in time after departure of the car 518. The security system gateway 502 can determine that the entries one, two, three, and four in the updated table 522 include an abnormal signal pattern as compared to entries in the table 520. For instance, the security system gateway 502 can determine that signal strengths from a number of devices are suddenly lower than previously recorded signal strengths. The security system gateway 502 can also determine that for a recent time interval at which signals are expected to be received from a set of devices, that only one device, the smart speakers 510, has sent a signal (and at a lower strength than historical signals). Previously, devices may have sent a signal every minute (or every second, etc.), for example. The smart television 506 and the gaming console 514 may not have sent a signal at an expected interval.

The security system gateway 502 can determine that the home 504 may be unoccupied by the owner (due to a lack of recent received signals from the car 518). The security system gateway 502 can determine that a combination of a potentially unoccupied home and degrading and vanishing signal strengths from devices that are normally in fixed locations and transmitting at stable signal strengths may indicate that a theft is occurring in the home 504 (e.g., as illustrated by a van 524 that includes a stolen gaming console 526, a stolen television 528, and stolen speakers 530 (corresponding to the gaming console 514, the smart television 506, and the smart speakers 510, respectively, which are now no longer in the home 504). The stolen gaming console 526 and the stolen television 528 are either no longer transmitting or are transmitting too far from the security system gateway 502 to be detected by the security system gateway 502 (e.g., as indicated by no-signal indicators 532 and 534, respectively). The stolen speakers 530 are transmitting a signal 536 that is able to be detected by the security system gateway 502 (as recorded in the entry four in the updated table 522), but at a weaker strength than when the smart speakers 510 were inside the home 504.

In response to detection of possible theft, the security system gateway 502 can automatically perform one or more actions, such as automatically sending a message to a registered security system user, notifying local police, generating an on-premise alarm, or some other type of action.

Figure 6:
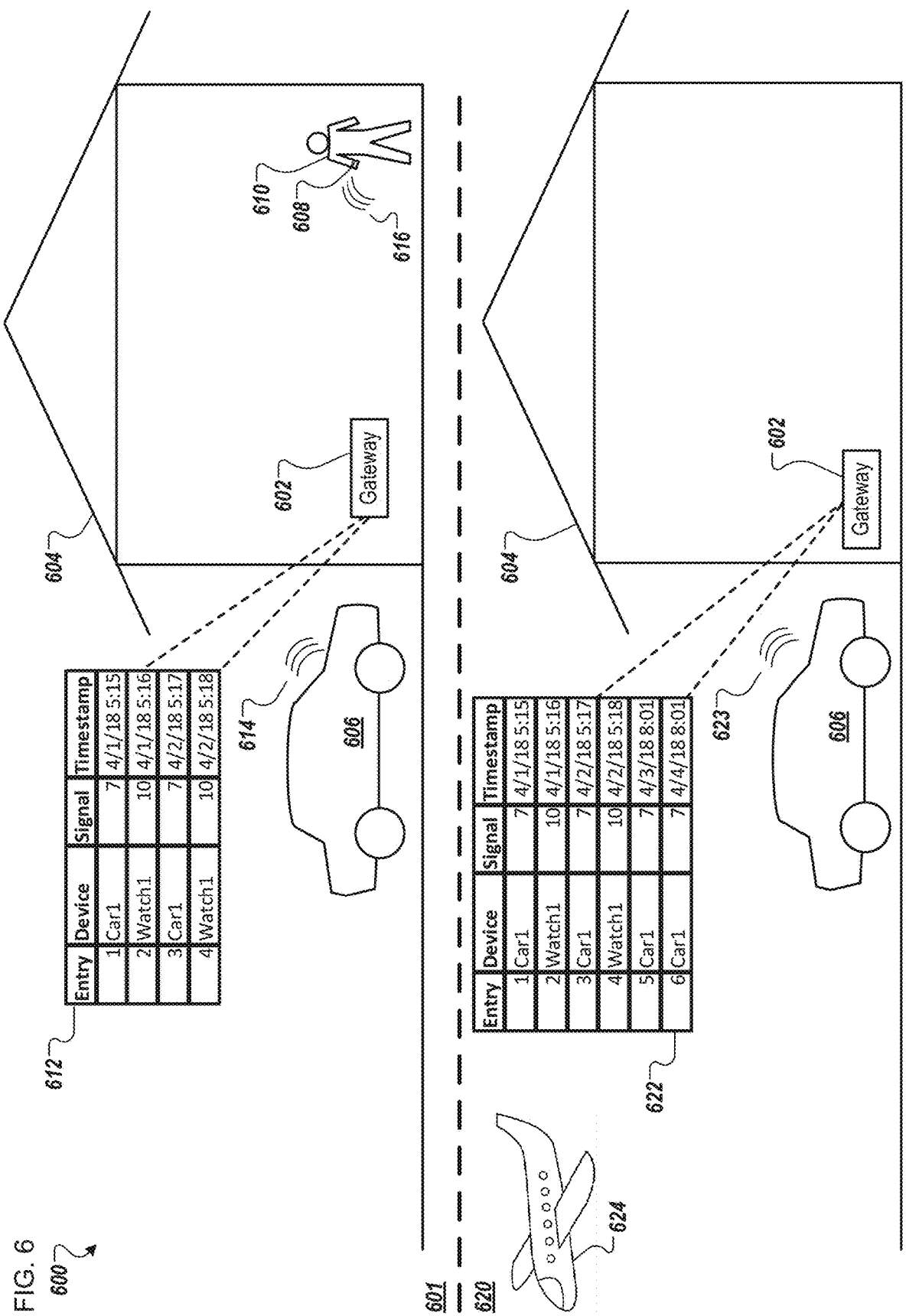
FIG. 6 is a conceptual diagram of an example system for automatically performing an action based on a pattern of signals from non-standard security devices.

FIG. 6 is a conceptual diagram of an example system 600 for automatically performing an action based on a pattern of signals from non-standard security devices. As illustrated in an upper portion 601 of FIG. 6, a security system gateway 602 in a home 604 receives signals from a car 606 and a smart watch 608 of a user 610. For instance, a table 612 managed by the security system gateway 602 includes entries for recorded signals from the car 606 and the smart watch 608. First and third entries in the table 612 include information for signals received from the car 606, including a most-recent signal 614. Second and fourth entries in the table 612 include information for signals received from the smart watch 608, including a most-recent signal 616. The first and third entries, and the second and fourth entries, indicate stable, relatively strong signals from the car 606 and the smart watch 608, respectively, indicating that the car 606 and the smart watch 608 are both located in or near the home 604. The security system gateway 602 can continue to monitor signals from the car 606, the smart watch 608, and other devices, over time.

For instance, as shown in a lower portion 620 of FIG. 6, an expanded table 622 includes additional entries five and six, corresponding to other received signals (including a most-recent signal 623) from the car 606, at a same (or similar) strength as previously-received signals from the car 606, indicating that the car 606 is still parked outside the home 604. However, the expanded table 622 does not include any further entries corresponding to the smart watch 608, indicating that the smart watch 608 (and possibly the user 610) is no longer in the home 604 (e.g., as illustrated in the lower portion 620). For instance, the user 610 may have left the car 606 at the home when flying in an airplane 624 to another destination.

The security system gateway 602 can determine, based on a continued detected presence of the car 606, and a lack of received signals from the smart watch 608 (or from other personal devices of the user 610, such as a mobile phone), that the user 610 may be away from the home 604. Accordingly, the security system gateway 602 can automatically perform one or more actions, such as automatically arming the security system. For instance, the user 610 may have forgotten to manually arm the security system when leaving for a trip. As another example, the security system gateway 602 can automatically send a message to the user 610, e.g., to the smart watch 608 and/or to another device associated with the user 610, that asks the user 610 if the security system should be automatically armed. The security system gateway 602 can arm the security system based on an affirmative response to the message sent to the user 610.

Figure 7:
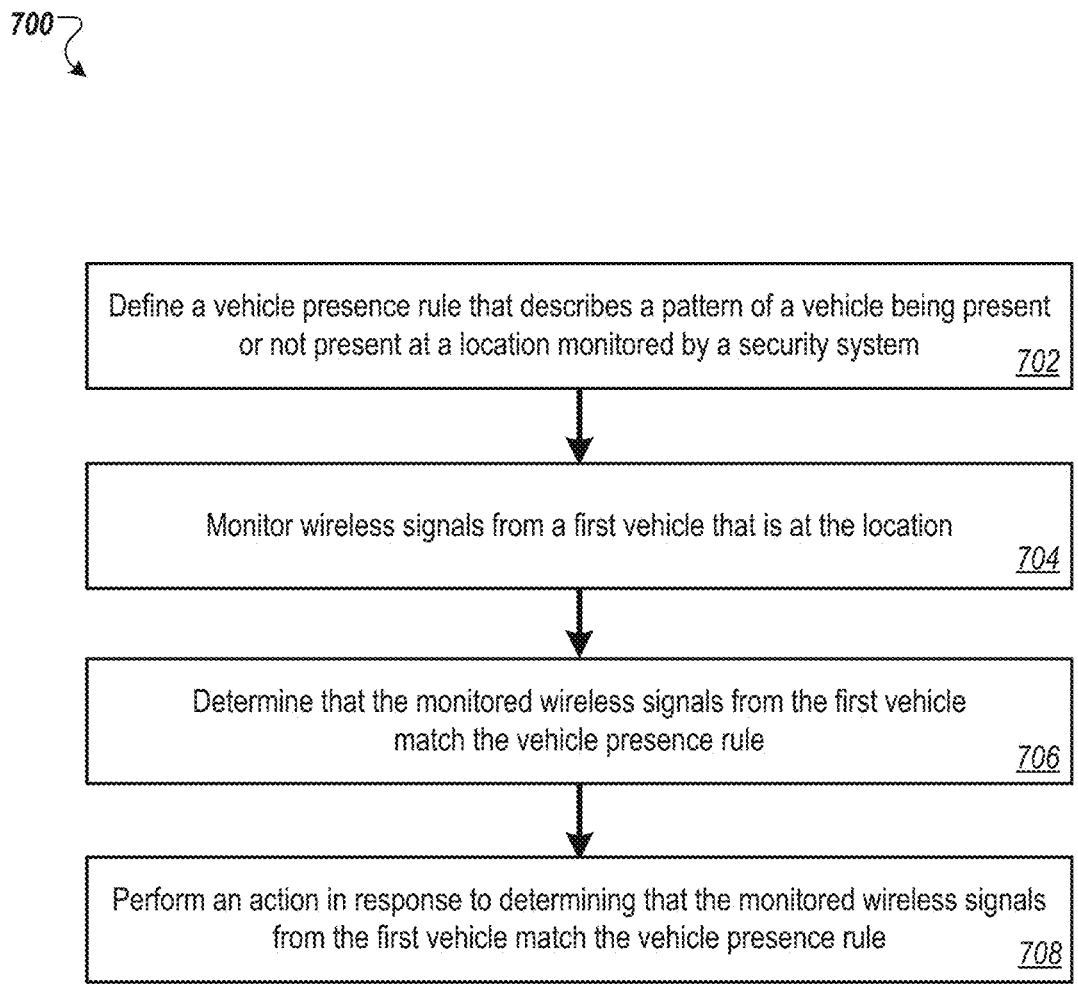
FIG. 7 depicts a flowchart of an example technique for performing an action in response to satisfaction of a vehicle system rule.

FIG. 7 depicts a flowchart of an example technique 700 for performing an action in response to satisfaction of an example vehicle system rule. The technique 700 can be performed by the gateway 100 of FIG. 1. Vehicle system rules is one example of non-standard security device rules.

The security system defines a vehicle system rule that describes a pattern of a vehicle being present or not present at a location monitored by the security system (702). The vehicle system rule defines an action to perform when the vehicle system rule is satisfied by the presence or non-presence of a respective vehicle.

The security system monitors wireless signals from a first vehicle (example non-standard security device) that is at the location (707). The first vehicle may be registered with (e.g., known to) the security system or may be unknown to the security system. The monitored wireless signals can indicate that the first vehicle is at the location. As another example, the monitored wireless signals can indicate that the first vehicle was at the location at a first point in time but is subsequently no longer at the location (e.g., based on wireless signals being detected at the first point in time and then no longer being detected at a second, later point in time).

The security system determines that the monitored wireless signals from the first vehicle match the vehicle system rule (706).

The security system performs the action in response to determining that the monitored wireless signals from the first vehicle match the vehicle system rule (708). For example, when the first vehicle is known to the security system and the monitored wireless signals indicate that the first vehicle is present at the location, the action can be to automatically disarm the security system (e.g., due to a known user being at the location (e.g., an owner coming home)). When the first vehicle is known to the security system and the monitored wireless signals indicate that the first vehicle is no longer present at the location, the action can be to automatically arm the security system (e.g., due to a known user leaving the location). When the first vehicle is not registered with the security system and the monitored wireless signals indicate that the first vehicle is present at the location, the action can be to automatically arm the security system (if the system is not already armed) and/or to generate an alert.

Figure 8:
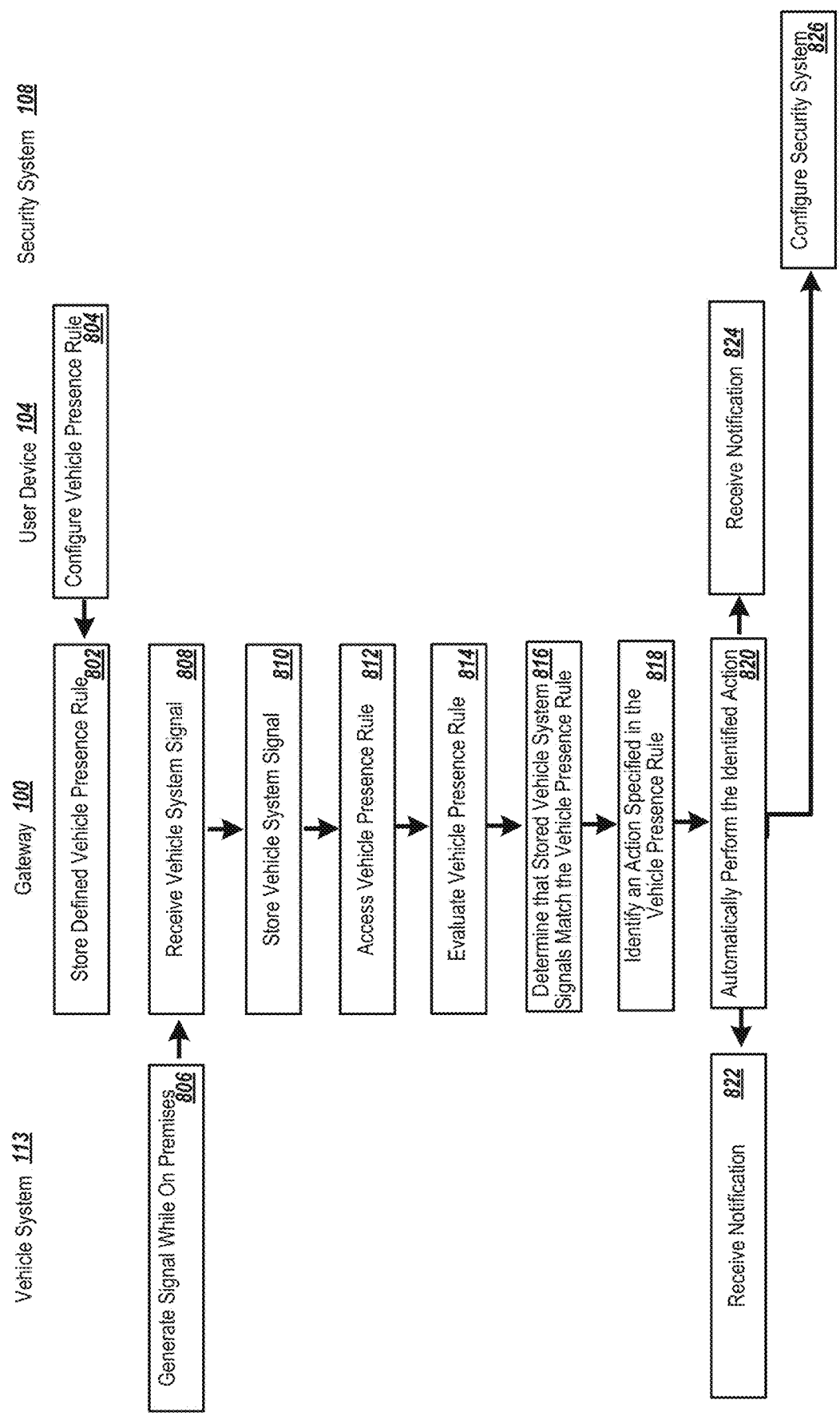
FIG. 8 is a swim lane diagram of an example process for automatically performing an action in response to satisfaction of a vehicle system rule.

FIG. 8 is a swim lane diagram of an example process 800 for automatically performing an action in response to satisfaction of an example vehicle system rule. For example, the process 800 can be performed, in part, by the gateway 100, the mobile device 102, and the vehicle system 113. Vehicle system rules is one example of non-standard security device rules.

At 802, a vehicle system rule is defined and stored in the gateway 100. In some implementations, at 804, the vehicle system rule is configured (and/or defined) using the mobile device 102. In some implementations, the vehicle system rule is predefined upon installation/deployment of the gateway 100. The vehicle system rule describes a pattern of a vehicle being present or not present at a location monitored by the gateway 100. The vehicle system rule defines an action to perform when the vehicle system rule is satisfied by the presence or non-presence of a respective vehicle.

At 806, the vehicle system 113 generates a wireless signal while at a premises monitored by the gateway 100.

At 808, the gateway 100 receives the wireless signal emitted from the vehicle system 113.

At 810, the gateway 100 stores the wireless signal received from the vehicle system 113.

At 812, the gateway 100 accesses the previously-defined vehicle system rule.

At 814, the gateway 100 evaluates the vehicle system rule. Evaluating the vehicle system rule can include comparing stored vehicle system signals to the pattern associated with the vehicle system rule.

At 816, the gateway 100 determines that stored vehicle system signals match the vehicle system rule.

At 818, the gateway 100 identifies an action to perform that is specified in the vehicle system rule.

At 820, the gateway 100 automatically performs the identified action. Automatically performing the action can include sending a notification to one or more devices or configuring a security system 108.

At 822, for example, the vehicle system 113 can automatically receive a notification regarding satisfaction of the vehicle system rule and an action that has (or will be) performed. The vehicle system 113 can receive a notification that the security system 108 is automatically being disarmed based on a detected presence of the vehicle system 113. As another example, the vehicle system 113 can receive a notification that the security system 108 is automatically being armed due to a non-detection of the vehicle system 113 after a period of a detected presence of the vehicle system 113 (e.g., due to a respective vehicle leaving a monitored premises). Received notifications can be displayed on a display of the vehicle system 113.

At 824, for example, the mobile device 102 can receive a notification. For example, a mobile device of a user can receive a notification about an automatic configuration of the security system 108.

At 826, for example, the security system 108 can be automatically configured. For example, the security system 108 can be automatically armed based on a determination that a vehicle is no longer at a monitored premises (e.g., an owner is leaving). As another example, the security system 108 can be automatically disarmed based on detection of a signal from a registered vehicle (e.g., an owner is arriving at the monitored premises).

Figure 9:
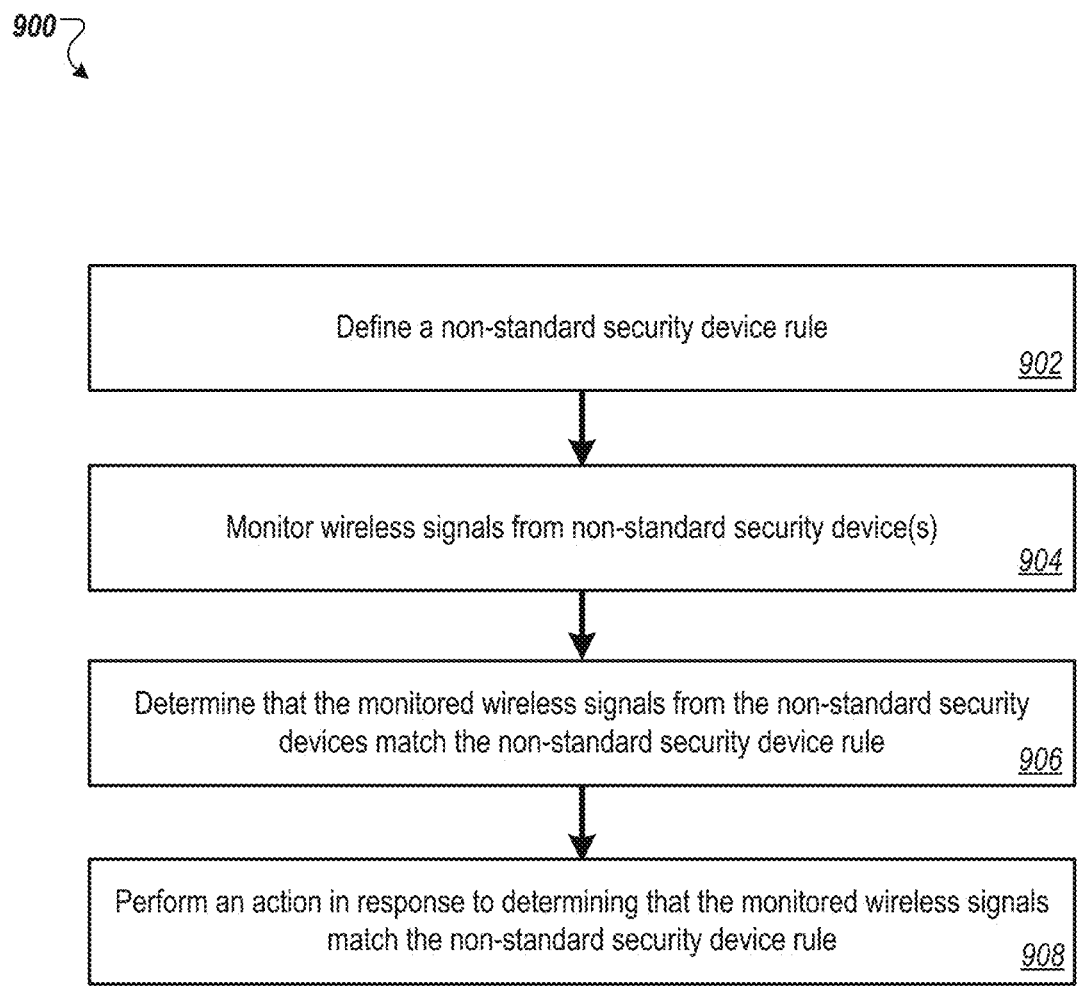
FIG. 9 depicts a flowchart of an example technique for performing an action in response to satisfaction of a non-standard security device rule.

FIG. 9 depicts a flowchart of an example technique 900 for performing an action in response to satisfaction of a non-standard security device rule. The technique 900 can be performed by the gateway 100 of FIG. 1.

At 902, a non-standard security device rule is defined that describes a pattern of signals, from one or more non-standard security devices, that may be received by a security system. The non-standard security device rule defines an action to perform when the non-standard security device rule is satisfied.

At 904, wireless signals from one or more non-standard security devices are monitored.

At 906, a determination is made that the monitored wireless signals from the one or more non-standard security devices match the non-standard security device rule.

At 908, the action is automatically performed in response to determining that the monitored wireless signals from the one or more non-standard security devices match the non-standard security device rule.

Figure 10:
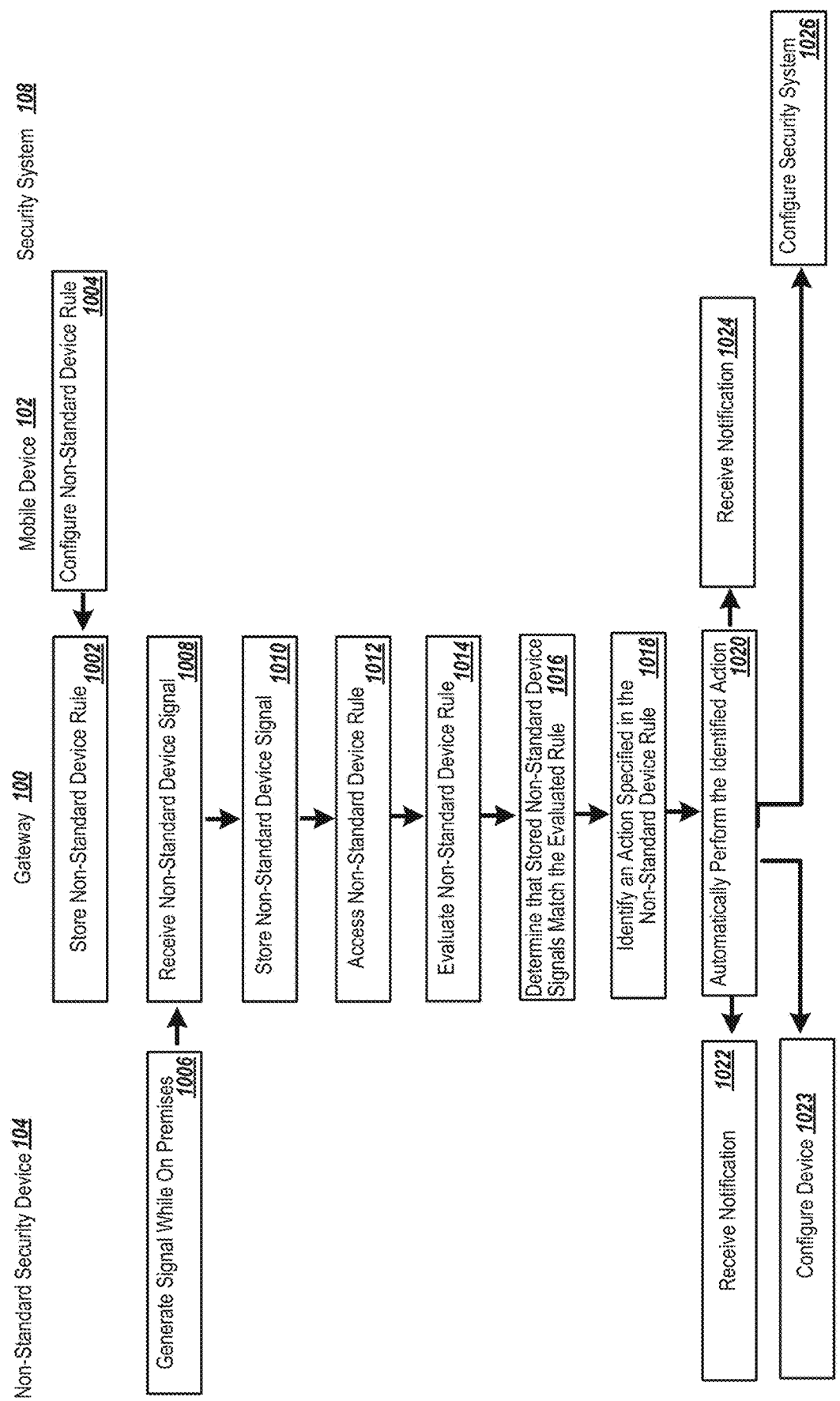
FIG. 10 is a swim lane diagram of an example process for automatically performing an action in response to satisfaction of a non-standard security device rule.

FIG. 10 is a swim lane diagram of an example process 1000 for automatically performing an action in response to satisfaction of a non-standard security device rule. For example, the process 1000 can be performed, in part, by the gateway 100, the mobile device 102, and a non-standard security device 104.

At 1002, a non-standard security device rule is defined and stored in the gateway 100. In some implementations, at 1004, the non-standard security device rule is configured (and/or defined) using the mobile device 102. In some implementations, the non-standard security device rule is predefined upon installation/deployment of the gateway 100. The non-standard security device rule describes a pattern of signals, from one or more non-standard security devices, that may be received by the gateway 100. The non-standard security device rule defines an action to perform when the non-standard security device rule is satisfied (by actual monitored signals).

At 1006, the non-standard security device 104 generates a wireless (or other type of) signal while at a premises monitored by the gateway 100.

At 1008, the gateway 100 receives the wireless signal emitted from the non-standard security device 104.

At 1010, the gateway 100 stores the wireless signal received from the non-standard security device 104.

At 1012, the gateway 100 accesses the previously-defined non-standard security device rule.

At 1014, the gateway 100 evaluates the non-standard security device rule. Evaluating the non-standard security device rule can include comparing stored non-standard security device signals to the pattern associated with the non-standard security device rule.

At 1016, the gateway 100 determines that stored non-standard security device signals match the non-standard security device rule.

At 1018, the gateway 100 identifies an action to perform that is specified in the non-standard security device rule.

At 1020, the gateway 100 automatically performs the identified action. Automatically performing the action can include sending a notification to one or more devices, configuring the security system 108, or configuring a non-standard security device.

At 1022, for example, the non-standard security device 104 can automatically receive a notification or message regarding satisfaction of the non-standard security device rule and an action that has (or will be) performed. The non-standard security device 104 can receive a notification that the security system 108 is automatically being armed or disarmed based on a signals received from non-standard security devices (and possibly other devices or systems).

At 1023, for example, the non-standard security device 104 can be automatically configured. For instance, due to a condition detected by the gateway 100 based on information the gateway 100 has received from the non-standard security device 104 (and possibly other systems or devices), the gateway 100 can instruct the non-standard security device 104 to send data at a faster frequency. For instance, due to a possible fire at the premises, the gateway 100 can instruct the non-standard security device 104 to send temperature readings every ten seconds rather than every five minutes.

At 1024, for example, the mobile device 102 can receive a notification. For example, a mobile device of a user can receive a notification about an automatic configuration of the security system 108 or a non-standard security device. As another example, the mobile device 102 can receive information about a condition or event at the premises that is associated with stored signals matching the pattern in the non-standard security device rule. For instance, the signals may represent a potential theft, intruder, natural disaster, resident arrival or departure, or other events. In some implementations, the user of the mobile device 102 can configure which types of events or conditions can lead to notifications being sent to the mobile device 102.

At 1026, for example, the security system 108 can be automatically configured. For example, the security system 108 can be automatically armed or disarmed based on information the gateway 100 has received from the non-standard security device 104 (and possibly other systems or devices).

Figure 11:
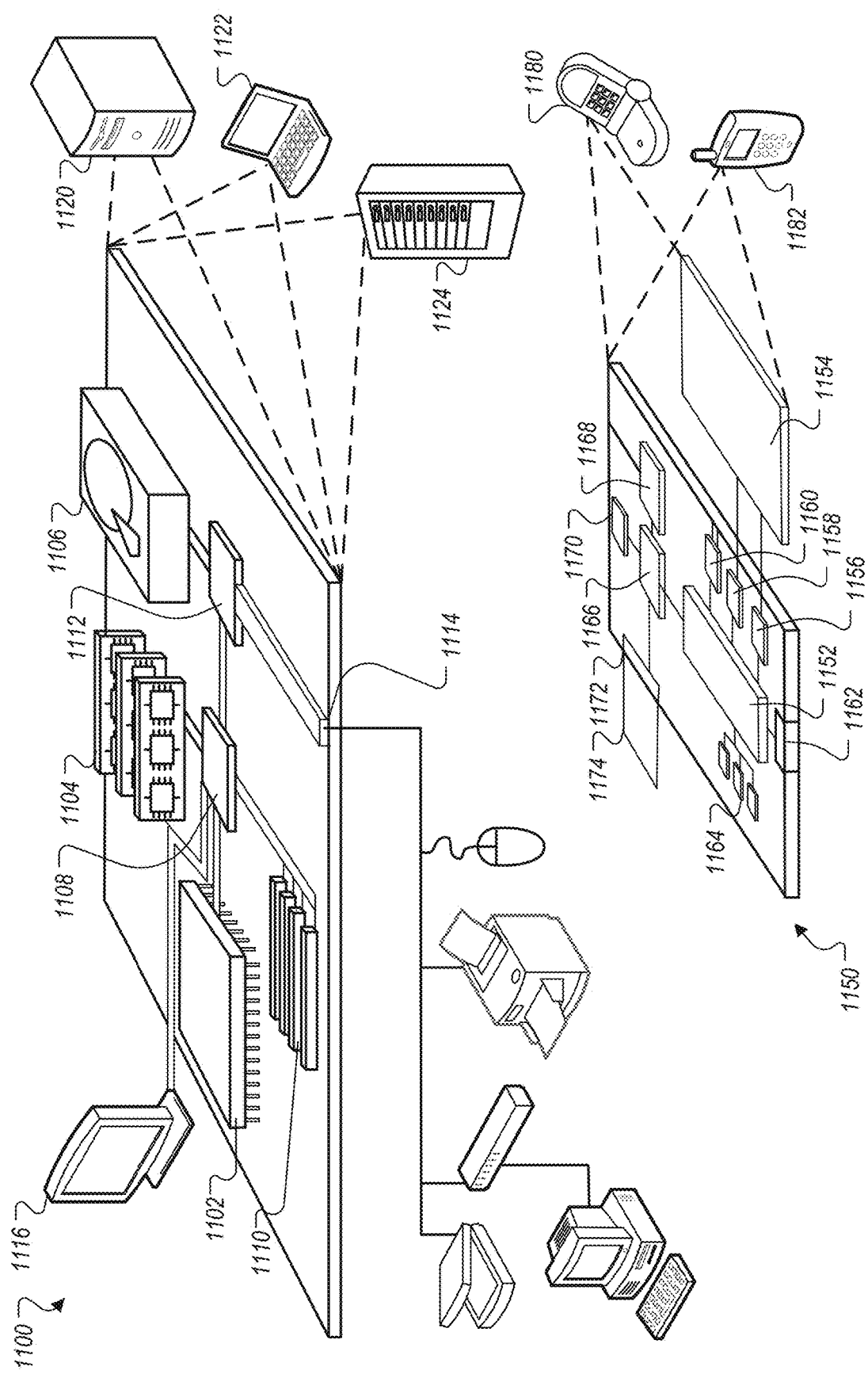
FIG. 11 is a block diagram of an example computer system that can be used to implement the methods, systems and processes described in this disclosure.

FIG. 11 is a block diagram of example computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1100 is further intended to represent any other typically non-mobile devices, such as televisions or other electronic devices with one or more processers embedded therein or attached thereto. Computing device 1150 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 1100 includes a processor 1102, memory 1104, a storage device 1106, a high-speed controller 1108 connecting to memory 1104 and high-speed expansion ports 1110, and a low-speed controller 1112 connecting to low-speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high-speed controller 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low-speed controller 1112 manages lower bandwidth-intensive operations. Such allocation of duties is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed bus 1114. The low-speed bus 1114 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms and/or virtualized, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as computing device 1150. Each of such devices may contain one or more of computing devices 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The computing device 1150 may also be provided with a storage device, such as a micro-drive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can process instructions for execution within the computing device 1150, including instructions stored in the memory 1164. The processor may also include separate analog and digital processors. The processor may provide, for example, for coordination of the other components of the computing device 1150, such as control of user interfaces, applications run by computing device 1150, and wireless communication by computing device 1150.

Processor 1152 may communicate with a user through control interface 1158 and display interface 1156 coupled to a display 1154. The display 1154 may be, for example, a TFT LCD display or an OLED display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provided in communication with processor 1152, so as to enable near area communication of computing device 1150 with other devices. External interface 1162 may provide, for example, for wired communication (e.g., via a docking procedure) or for wireless communication (e.g., via Bluetooth® or other such technologies).

The memory 1164 stores information within the computing device 1150. In one implementation, the memory 1164 is a computer-readable medium. In one implementation, the memory 1164 is a volatile memory unit or units. In another implementation, the memory 1164 is a non-volatile memory unit or units. Expansion memory 1174 may also be provided and connected to computing device 1150 through expansion interface 1172, which may include, for example, a subscriber identification module (SIM) card interface. Such expansion memory 1174 may provide extra storage space for computing device 1150, or may also store applications or other information for computing device 1150. Specifically, expansion memory 1174 may include instructions to carry out or supplement the processes described above, and may include secure information also. Thus, for example, expansion memory 1174 may be provide as a security module for computing device 1150, and may be programmed with instructions that permit secure use of computing device 1150. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152.

Computing device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1168 (e.g., a radio-frequency transceiver). In addition, short-range communication may occur, such as using a Bluetooth®, WiFi, or other such transceiver (not shown). In addition, GPS receiver module 1170 may provide additional wireless data to computing device 1150, which may be used as appropriate by applications running on computing device 1150.

Computing device 1150 may also communicate audibly using audio codec 1160, which may receive spoken information from a user and convert it to usable digital information. Audio codec 1160 may likewise generate audible sound for a user, such as through a speaker, e.g., in a handset of computing device 1150. Such sound may include sound from voice telephone calls, may include recorded sound (e.g., voice messages, music files, etc.) and may also include sound generated by applications operating on computing device 1150.

The computing device 1150 may be implemented in a number of different forms, as shown in the figure. For example, it may be implemented as a cellular telephone 1180. It may also be implemented as part of a smartphone 1182, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a security system gateway located at a premises, signals from standard security devices enrolled with the security system gateway as part of a security system for the premises, wherein the standard security devices are configured to identify information about a current state of the premises and to include the identified information in the signals, wherein the standard security devices are enrolled as part of a closed enrollment paradigm for the security system;
performing, by the security system gateway, security actions in response to receiving the signals from the standard security device,
registering, with the security system gateway, a first non-standard security device outside of the closed enrollment paradigm for the security system, wherein the first non-standard security device is registered using a first identifier included in first wireless signals transmitted by the first non-standard security device, wherein the first non-standard security device has a primary function that is different from and unrelated to the security system;
recording, by the security system gateway over a period of time, a corpus of wireless signals transmitted at or near the premises and detected by the security system gateway, wherein the wireless signals are recorded with, at least, a device identifier, a signal strength, and a timestamp for each transmission;
automatically determining, by the security system gateway, first rules for the first non-standard security device based a first presence pattern for the first non-standard security device detected from the corpus of wireless signals using the first identifier, wherein the first rules define first security actions for the security system to automatically perform when one or more of the first rules is satisfied, wherein a particular first rule of the first rules detects arrival of the first non-standard security device at the premises and a corresponding particular first security action of the first security actions comprises automatic disarming of the security system when the particular first rule is satisfied;
automatically determining, by the security system gateway, second rules for second non-standard security devices that are not registered with the security system gateway based on, at least, the corpus of wireless signals and the device identifiers included therein, wherein the second rules define second security actions for the security system to automatically perform when one or more of the second rules is satisfied, wherein a particular second rule of the second rules detects arrival of any of the second non-standard security devices at the premises and a corresponding particular second security action of the second security actions comprises automatic arming of the security system when the particular second rule is satisfied;
continuously monitoring, by the security system gateway, the signals from the standard security system components and wireless signals from non-standard security devices that are located at or near the premises, wherein the security system gateway is configured to control the security system by performing the security action based on the signals received from the standard security devices and to additionally control the security system by perform the first security actions and the second security actions based on application of the first rules and the second rules to the wireless signals from non-standard security devices;
controlling, by the security system gateway, the security system based on the continuously monitoring, wherein the controlling comprises:
automatically disarming the security system when the particular first rule is satisfied based on first wireless signals detected for the first non-standard security device indicating that the first non-standard security device has arrived at the premises; and
automatically arming the security system when the particular second rule is satisfied based on second wireless signals detected for the second non-standard security devices indicating that at least one of the second non-standard security device has arrived at the premises.

2. The method of claim 1, wherein the particular second security action additionally comprises generating an alert.

3. The method of claim 1, wherein another of the first rules anticipates arrival of the first non-standard security device at the premises based on historic arrival patterns for the first non-standard security device at the premises and is satisfied when a current time matches the historic arrival pattern, wherein a corresponding other of the first security actions comprises automatically disarming the security system based on the other of the first rules being satisfied and without detecting presence of the first non-standard security device at the premises.

4. The method of claim 3, wherein other of the first rules is further configured to automatically arm the security system after a threshold amount of time has elapsed since disarming the security system without the first non-standard security device arriving at the premises.

5. The method of claim 1, wherein security system gateway is configured to use the first rules and the second rules to detect abnormal signal patterns for the non-standard security devices and to perform corresponding security actions in response to detection of the abnormal signal patterns.

6. The method of claim 5, wherein the abnormal signal pattern is defined in reference to a normal signal pattern determined from historical signals from the non-standard security devices.

7. The method of claim 1, wherein the first non-standard security device comprises a first vehicle and the second non-standard security devices comprise second vehicles different from the first vehicle.

8. The method of claim 1, wherein the first non-standard security device comprises a first IoT device and the second non-standard security devices comprise second IoT devices different from the first IoT device.

9. The method of claim 1, wherein the first non-standard security device comprises a first mobile computing device and the second non-standard security devices comprise second mobile computing devices different from the first mobile computing device.

10. The method of claim 9, wherein the first mobile computing device and the second mobile computing devices comprise smartphones.

11. The method of claim 9, wherein the first mobile computing device and the second mobile computing devices comprise wearable devices.

* * * * *